United States Patent [19]
Okayama

[11] Patent Number: 5,903,606
[45] Date of Patent: May 11, 1999

[54] DATA RECEPTION DEVICE WITH ERROR DETECTION AND CORRECTION

[75] Inventor: Kouichiro Okayama, Fujiyoshida, Japan

[73] Assignee: Kokusai Electric Co., Ltd., Tokyo, Japan

[21] Appl. No.: 08/710,981

[22] Filed: Sep. 25, 1996

[30] Foreign Application Priority Data

Sep. 27, 1995 [JP] Japan ................................. 7-273645

[51] Int. Cl.[6] ............................ H04B 3/46; H04B 17/00; G06F 11/00
[52] U.S. Cl. ......................... 375/228; 371/40.2; 371/5.1; 375/224
[58] Field of Search .................................. 375/228, 224; 371/41, 5.1, 2.1, 37.08, 37.12, 40.2, 40.11

[56] References Cited

U.S. PATENT DOCUMENTS

| | | | |
|---|---|---|---|
| 4,618,955 | 10/1986 | Sharpe et al. | 371/38.1 |
| 4,701,914 | 10/1987 | Matsushita | 371/40.2 |
| 4,958,349 | 9/1990 | Tanner et al. | 371/37.08 |
| 5,311,520 | 5/1994 | Raghavachari | 371/21.6 |
| 5,533,035 | 7/1996 | Saxena et al. | 371/38.1 |

FOREIGN PATENT DOCUMENTS

| | | |
|---|---|---|
| WO94/09569 | 4/1994 | WIPO . |
| WO94/09598 | 4/1994 | WIPO . |

*Primary Examiner*—Stephen Chin
*Assistant Examiner*—Betsy L. Deppe
*Attorney, Agent, or Firm*—Wenderoth, Lind & Ponack, L.L.P.

[57] ABSTRACT

A receiver receives transmitted data, and a decoder detects the number of error bits in the received data based on check data contained in the received data. If the number of error bits is 2 or less, then when an error correction is instructed by a selector switch, the decoder effects an error correction on message data, and the corrected message data are stored in a RAM. If the number of error bits is more than 2, the decoder does not effect an error correction on the message data, and the message data with error bits are stored in the RAM. When the message data stored in the RAM are displayed on a display screen, the user sees either the corrected message or the uncorrected message.

10 Claims, 9 Drawing Sheets

| BIT NO. | 1 | 2~19 | 20/21 | 22~31 | 32 |
|---|---|---|---|---|---|
| ADDRESS CODE WORD | MESSAGE FLAG | ADDRESS/MESSAGE BIT | FUNCTION BIT | CHECK DATA | EVEN PARITY |

| BIT POSITION | SYNDROME TABLE | | | | | | | | | | | | |
| --- | --- | --- | --- | --- | --- | --- | --- | --- | --- | --- | --- | --- | --- |
| 31 | 1 | 1 | 1 | 0 | 1 | 1 | 0 | 1 | 0 | 0 | E | D | C |
| 30 | 0 | 1 | 1 | 1 | 0 | 1 | 1 | 0 | 1 | 0 | 7 | 6 | 8 |
| 29 | 0 | 0 | 1 | 1 | 1 | 0 | 1 | 1 | 0 | 1 | 3 | B | 4 |
| 28 | 1 | 1 | 1 | 1 | 0 | 0 | 0 | 0 | 1 | 0 | F | 6 | 8 |
| 27 | 0 | 1 | 1 | 1 | 1 | 0 | 0 | 0 | 0 | 1 | 7 | 8 | 4 |
| 26 | 1 | 1 | 0 | 1 | 0 | 0 | 0 | 1 | 0 | 0 | D | 1 | 0 |
| 25 | 0 | 1 | 1 | 0 | 1 | 0 | 0 | 0 | 1 | 0 | 6 | 8 | 8 |
| 24 | 0 | 0 | 1 | 1 | 0 | 1 | 0 | 0 | 0 | 1 | 3 | 4 | 4 |
| 23 | 1 | 1 | 1 | 1 | 0 | 1 | 1 | 1 | 0 | 0 | F | 7 | 0 |
| 22 | 0 | 1 | 1 | 1 | 1 | 0 | 1 | 1 | 1 | 0 | 7 | B | 8 |
| 21 | 0 | 0 | 1 | 1 | 1 | 1 | 0 | 1 | 1 | 1 | 3 | D | C |
| 20 | 1 | 1 | 1 | 1 | 0 | 0 | 1 | 1 | 1 | 1 | F | 3 | C |
| 19 | 1 | 0 | 0 | 1 | 0 | 1 | 0 | 0 | 1 | 1 | 9 | 4 | C |
| 18 | 1 | 0 | 1 | 0 | 0 | 1 | 1 | 1 | 0 | 1 | A | 7 | 4 |
| 17 | 1 | 0 | 1 | 1 | 1 | 1 | 1 | 0 | 1 | 0 | B | E | 8 |
| 16 | 0 | 1 | 0 | 1 | 1 | 1 | 1 | 1 | 0 | 1 | 5 | F | 4 |
| 15 | 1 | 1 | 0 | 0 | 0 | 0 | 1 | 0 | 1 | 0 | C | 2 | 8 |
| 14 | 0 | 1 | 1 | 0 | 0 | 0 | 0 | 1 | 0 | 1 | 6 | 1 | 4 |
| 13 | 1 | 1 | 0 | 1 | 1 | 1 | 0 | 1 | 1 | 0 | D | D | 8 |
| 12 | 0 | 1 | 1 | 0 | 1 | 1 | 1 | 0 | 1 | 1 | 6 | E | C |
| 11 | 1 | 1 | 0 | 1 | 1 | 0 | 1 | 0 | 0 | 1 | D | A | 4 |
| 10 | 1 | 0 | 0 | 0 | 0 | 0 | 0 | 0 | 0 | 0 | 8 | 0 | 0 |
| 9 | 0 | 1 | 0 | 0 | 0 | 0 | 0 | 0 | 0 | 0 | 4 | 0 | 0 |
| 8 | 0 | 0 | 1 | 0 | 0 | 0 | 0 | 0 | 0 | 0 | 2 | 0 | 0 |
| 7 | 0 | 0 | 0 | 1 | 0 | 0 | 0 | 0 | 0 | 0 | 1 | 0 | 0 |
| 6 | 0 | 0 | 0 | 0 | 1 | 0 | 0 | 0 | 0 | 0 | 0 | 8 | 0 |
| 5 | 0 | 0 | 0 | 0 | 0 | 1 | 0 | 0 | 0 | 0 | 0 | 4 | 0 |
| 4 | 0 | 0 | 0 | 0 | 0 | 0 | 1 | 0 | 0 | 0 | 0 | 2 | 0 |
| 3 | 0 | 0 | 0 | 0 | 0 | 0 | 0 | 1 | 0 | 0 | 0 | 1 | 0 |
| 2 | 0 | 0 | 0 | 0 | 0 | 0 | 0 | 0 | 1 | 0 | 0 | 0 | 8 |
| 1 | 0 | 0 | 0 | 0 | 0 | 0 | 0 | 0 | 0 | 1 | 0 | 0 | 4 |
| 0 | | | | | | | | | | | | | |

WHEN DATA ARE RECEIVED (2 BITS ERROR):

| POSITION | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | S1 | PARITY |
|---|---|---|---|---|---|---|---|---|---|---|---|---|---|---|---|---|---|---|---|---|---|---|---|---|---|---|---|---|---|---|---|---|---|
| BIT | 1 | ☐ | ☐ | 0 | 0 | 0 | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 1 | 1 | 0 | 1 |
| SYNDROME DATA | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | | 0 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | 1 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | | 0 |
| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | 1 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | 1 |
| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | | 1 |
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | | 1 |
| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | | 1 |

DATA / CHECK DATA / PARITY

DATA RECEPTION DEVICE WITH ERROR DETECTION AND CORRECTION

BACKGROUND OF THE INVENTION

1. Field of the Invention

The present invention relates to a data reception device capable of correcting an error that has occurred in received data based on check data contained in the received data.

2. Description of the Related Art

Data reception devices for receiving data, including message data, are available in a wide range of sizes from relatively large sizes to relatively small sizes for portable use and attachment to information processing apparatus.

Small-size data reception devices, for example, have been realized as card-type data reception devices for use as unidirectional-communication pagers (so-called "pocket bells") in wide-area communication services and radio modems used as a component of radio LANs (local area networks) for data communication.

FIG. 1 of the accompanying drawings shows an example in which a card-type data reception device 1 is used. The card-type data reception device 1, which is portable, receives data transmitted through a radio channel from a base station when it is carried by the user, and stores message data contained in the received data in an internal memory such as a RAM, for example. For displaying the message data stored in the memory, the card-type data reception device 1 is inserted into a card slot 3 in an information processing apparatus 2 such as a personal computer or the like, and the message data are read from the memory and displayed on a display screen of the information processing apparatus 2.

When the card-type data reception device 1 is inserted as a PCMCIA card in the information processing apparatus 2, the card-type data reception device 1 receives data and stores message data of the received data in the memory, and the stored message is read and displayed on the display screen of the information processing apparatus 2.

In data communications, an error may occur in data while they are being transmitted or received, due to a malfunction of an electric circuit or noise.

Therefore, it has been customary in such data communications for a data transmitter to add an error-correcting code known as a BCH (Bose Chaudhuri Hocquenghem, same is applied hereinafter) code to data to be transmitted, and for a data reception device to detect error bits which are 2 bits or less in the received data and correct them. If an error of more than 2 bits occurs in the received data, then because the error cannot be corrected, the message code in the received data is replaced with a space letter code and stored in the memory.

When the message data stored in the memory which contains such a space letter code are displayed on the display screen of the information processing apparatus, many space letters are contained in the displayed message, making the user uncertain as to whether the displayed space letters are meant to indicate either real space letters or information indicating that the error has not been corrected.

If the card-type data reception device is inserted in the information processing apparatus to process received data, then since the clock signal used in the information processing apparatus for processing data interferes with the received data from the card-type data reception device, the received data from the card-type data reception device are more likely to suffer an error than if the card-type data reception device is carried by the user for receiving data.

SUMMARY OF THE INVENTION

It is therefore an object of the present invention to provide a data reception device which allows the user to instruct the data reception device to correct an error contained in received data or not, thereby preventing the user from failing to ascertain the meaning of space letters substituted as a result of an error correction, and which displays message data suffering an error as they are to convey the message to the user to a certain extent.

Another object of the present invention is to provide a data reception device which determines whether an error correction is to be carried out or not depending on the number of error bits that can be corrected, thereby preventing the user from failing to ascertain the meaning of space letters substituted as a result of an error correction, and which displays message data suffering an error as they are to convey the message to the user to a certain extent.

To achieve above objects, there is provided a data reception device for receiving data including message data and check data for checking an error, comprising receiver means for receiving data which are transmitted, decision means for detecting whether the received data suffers an error or not based on the check data contained in the received data, selector means for instructing an error correction to be carried out on an error, correcting means for effecting an error correction on the message data contained in the received data which suffer an error as detected by the decision means, based on an instruction given by the selector means, and memory means for storing the message data contained in the received data.

The receiver means receives data transmitted from a base station or the like, and the decision means decides whether an error such as a transmission error or the like has occurred in the received data or not based on the check data in the received data.

When an error correction is instructed by the selector means, the correcting means effects an error correction on the message data contained in the received data which suffers the error, and the corrected message data are stored in the memory means. When no error correction is instructed by the selector means, the correcting means effects no error correction on the message data, and the message data with error bits are directly stored in the memory means.

Therefore, when the message represented by the message data stored in the memory means is displayed on a display screen of an information processing apparatus, the user sees either the corrected message or the uncorrected message depending on the instruction from the selector means.

To achieve above objects, there is also provided a data reception device for receiving data including message data and check data for checking an error, comprising receiver means for receiving data which are transmitted, decision means for detecting the number of error bits contained in the received data based on the check data contained in the received data, correction indicating means for indicating an error correction to be carried out on an error if the detected number of error bits is a predetermined number or smaller, correcting means for effecting an error correction on the message data contained in the received data which suffer an error as detected by the decision means, based on an indication given by the correction indicating means, and memory means for storing the message data contained in the received data.

The receiver means receives data transmitted from a base station or the like, and the decision means decides how many error bits such as transmission error bits have occurred in the received data based on the check data in the received data.

If the number of error bits is a predetermined number or smaller, then the correction indicating means indicates an error correction to be carried out, the correcting means effects an error correction on the message data contained in the received data which suffers the error, and the corrected message data are stored in the memory means. If the number of error bits is greater than the predetermined number, then the correcting means effects no error correction on the message data, and the message data with error bits are directly stored in the memory means.

Therefore, when the message represented by the message data stored in the memory means is displayed on a display screen of an information processing apparatus, the user sees either the corrected message or the uncorrected message depending on the indication from the correction indicating means.

The data reception device further comprises selector means for instructing an error correction to be carried out on an error, the correcting means effects an error correction on the message data contained in the received data based on an indication given by the correction indicating means and an instruction given by the selector means. Depending on the number of error bits and the instruction from the selector means, the corrected message or the uncorrected message which contains error bits is stored in the memory means.

If the check data comprise BCH data, then the decision means refers to a syndrome table to identify an error bit, the correction indicating means indicates an error correction to be carried out on an error if the detected number of error bits is 2 or smaller, and the correcting means corrects an error bit which is identified by the decision means. Consequently, if the detected number of error bits is 2 or smaller, the corrected message is stored in the memory means, and if the detected number of error bits is greater than 2, then the uncorrected message which contains error bits is directly stored in the memory means.

The data received by the receiver means contain a flag indicating whether the received data is related to an address or a message, address or message data, and check data for inspecting an error. The data reception device further comprises type determination means for determining a type of the received data based on the flag, and control means for adding identifier data indicative of the occurrence of an error to message data on which no error correction is to be made by the correcting means, and storing the message data with the added identifier data in the memory means. Therefore, the uncorrected message data stored in the memory means are accompanied by an identifier indicative of the occurrence of an error, drawing attention of the user who sees a displayed message represented by the stored message data.

The data reception device is typically used as a card-type data reception device, and further comprises interface means for connecting the card-type data reception device to an information processing apparatus having a display unit, and transmitting the message data stored in the memory means to the information processing apparatus for display on the display unit.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 7 is a diagram showing a syndrome table;

FIG. 8 is a diagram illustrative of an error bit identifying process for no error bit;

FIG. 9 is a diagram illustrative of an error bit identifying process for one error bit; and FIG. 10 is a diagram illustrative of an error bit specifying process for two error bits.

DETAILED DESCRIPTION OF THE PREFERRED EMBODIMENTS

Figures 1, 2:
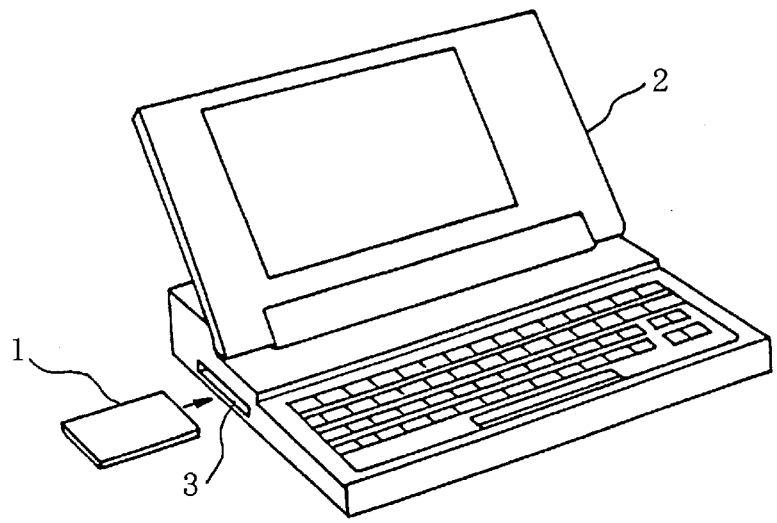
FIG. 1 is a perspective view of a card-type data reception device which is used with an information processing apparatus.
FIG. 2 is a diagram showing a structure of data received by the card-type data reception device.

A data reception apparatus according to the present invention, which is typically used as a card-type data reception device 1 shown in FIG. 1, receives data such as sports information, stock information, etc. transmitted through radio channels from a base station when it is carried by the user. In another mode of use, the card-type data reception device 1 is inserted in a card slot 3 in an information processing apparatus 2 such as a personal computer, and receives data and stores message data of the received data in an internal memory. The stored message data are read from the memory and displayed on a display screen of the information processing apparatus 2.

As shown in FIG. 2, the received data are of a structure comprising units of 32 bits. Each of the units has a 1st bit assigned to a flag, 2nd through 19th bits assigned to address and message data, 20th and 21st bits assigned to four functions, 22nd through 31st bits assigned to check data, and a 32nd bit assigned to a parity bit.

The flag may be of a bit "0" assigned to an address or a bit "1" assigned to a message, indicating whether the received data is related to an address or a message.

The check data comprise a BCH code, and the parity bit comprises an even parity bit. According to the present invention, however, the check data may comprise another cyclic code such as a Hamming code, a Reed-Solomon code, or the like, and the parity bit comprises an odd parity bit.

Figure 3:
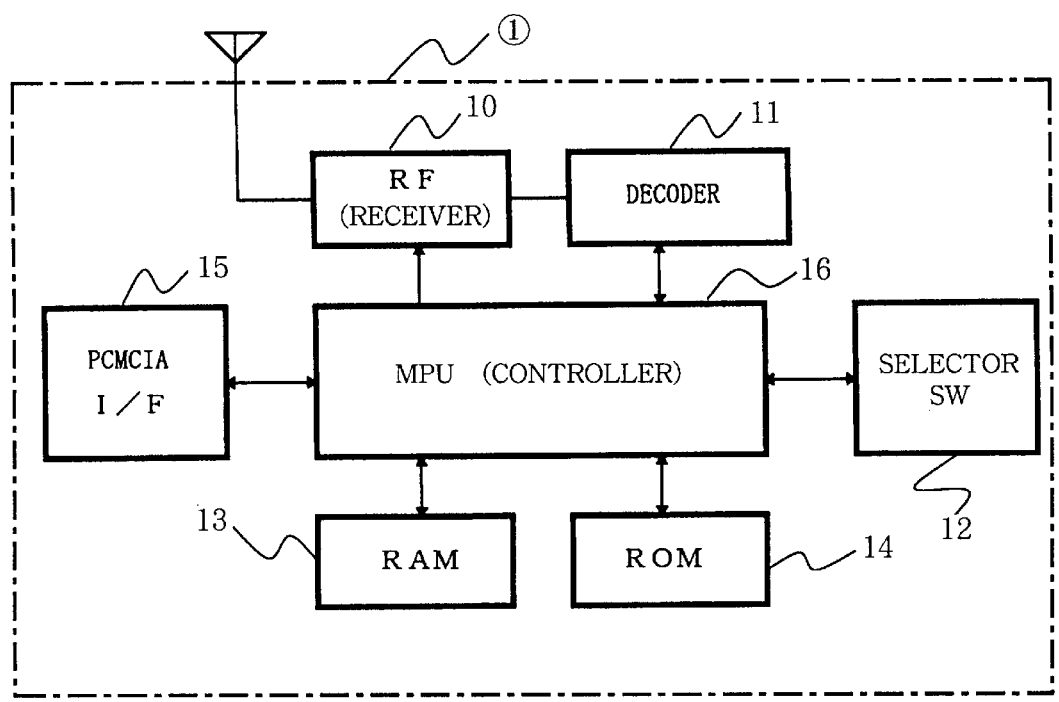
FIG. 3 is a block diagram of a data reception device according to a first embodiment of the present invention, used as the card-type data reception device.

As shown in FIG. 3, the card-type data reception device 1 as a data reception device according to a first embodiment of the present invention comprises a receiver 10 for receiving data transmitted through a radio channel from a base station or the like, a decoder 11 for analyzing the received data, a selector switch 12 operable by the user of the card-type data reception device 1, a random-access memory (RAM) 13, a read-only memory (ROM) 14, an interface 15 for connecting the card-type data reception device 1 to the information processing apparatus 2, and a controller 16 for controlling the receiver 10, the decoder 11, the selector switch 12, the RAM 13, the ROM 14, and the interface 15.

The decoder 11 serves to analyze the data received by the receiver 10 in various ways. Specifically, the decoder 11 has a type determining means for determining whether the received data are related to an address or a message based on the flag, a decision means for detecting whether the received data suffers an error based on the check data and also detecting the number of produced error bits, a correction indicating means for indicating the execution of an error correction if the detected number of error bits is 2 or less, and a correcting means for executing an error correction on the received data that suffers an error.

The user enters an instruction as to whether an error correction is to be executed or not through the selector switch 12. When an instruction indicative of an error correction to be executed is entered through the selector switch 12 and the execution of an error correction is indicated by the correction indicating means of the decoder 11, the correcting means executes an error correction on the received data.

The RAM 13 is supplied with the received data which have been analyzed by the decoder 11, and stores the message data contained in the received data which are supplied.

The ROM 14 stores an operation program for the data reception device and an identifier (ID) of the data reception device. The decoder 11 decides whether the received data are destined for the data reception device of its own or not based on the identifier and the address data contained in the received data.

When the data reception device is inserted in the card slot 3, the interface 15 is connected to an internal circuit of the information processing apparatus 2, and outputs the message data stored in the RAM 13 to the information processing apparatus 2.

A process of receiving data with the data reception device will be described below with reference to FIGS. 4 and 5. Address data and message data are successively transmitted from a base station, and successively received by the data reception device in the order named.

Figure 4:
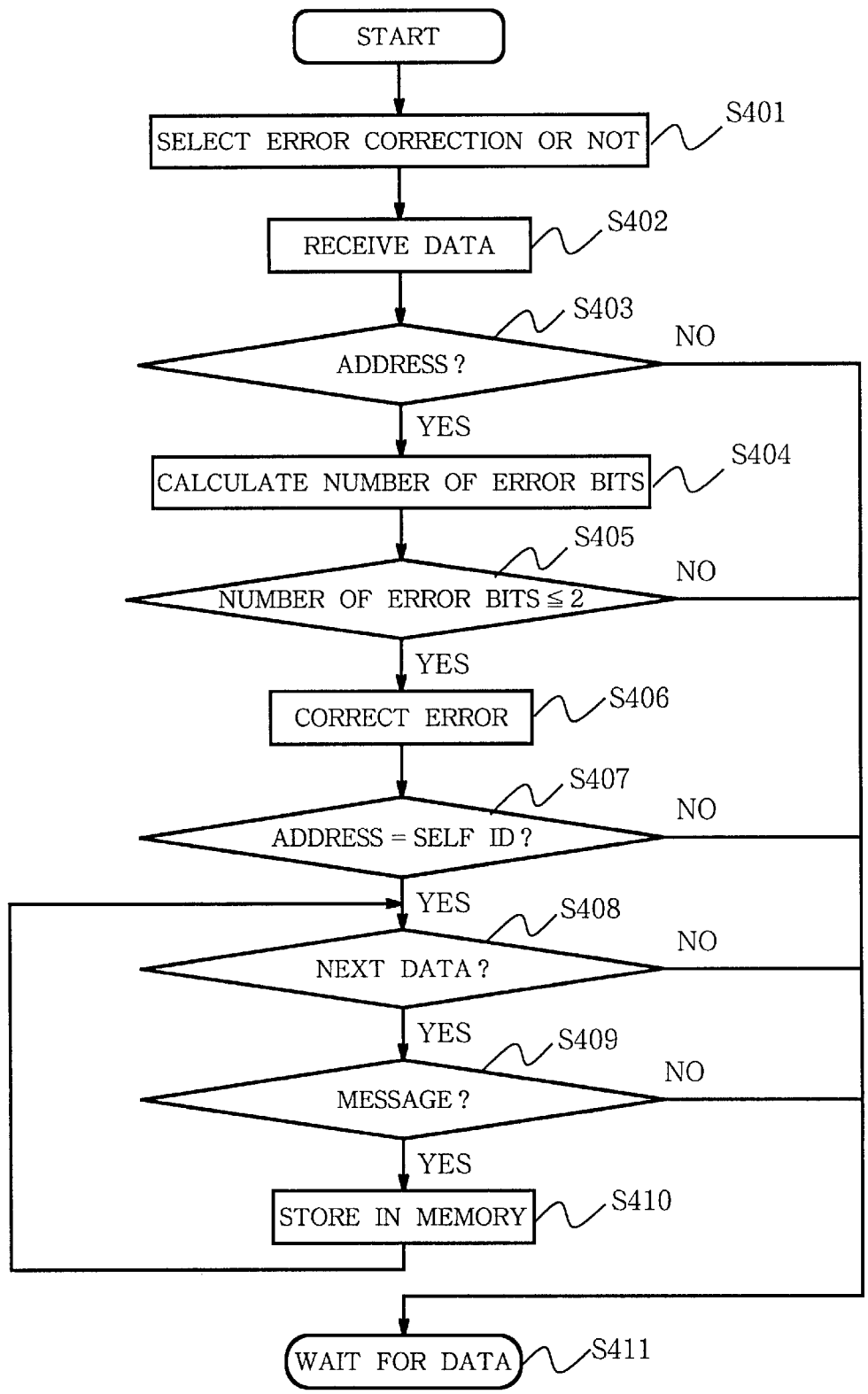
FIG. 4 is a flowchart of a data reception process effected by the data reception device when no error correction is to be carried out on message data.

FIG. 4 shows a data reception process effected by the data reception device when no error correction is to be carried out on the message data as instructed by the selector switch 12.

After the selector switch 12 has been shifted to a position indicating that no error correction is to be carried out on the message data in a step S401, the receiver 10 starts receiving data in a step S402. The decoder 11 decides whether the received data are related to an address or not based on the flag contained in the received data in a step S403.

If the received data are not related to an address, then, because the received data are data that should not be received at the time of starting to receive the data, the controller 16 keeps the receiver 10 in a standby condition, waiting for data related to an address in a step S411. If the received data are related to an address, then the decoder 11 inspects the received data based on the check data (BCH code) contained in the received data to determine whether an error has occurred or not and to calculate the number of error bits, if any, in a step S404.

Then, the decoder 11 decides whether the number of error bits is 2 or less in a step S405. If the number of error bits is more than 2, then, because it is difficult to recover the data even when the error is corrected, the controller 16 keeps the receiver 10 in a standby condition, waiting for data related to an address again in the step S411.

If the number of error bits is 2 or less, then the decoder 11 effects an error correction on the received data thereby to recover the data in a step S406. The controller 16 compares the address data of the received data with its own identifier (ID) stored in the ROM 14 to decide whether the received data are destined for the data reception device of its own or not in a step S407. If the address data of the received data do not agree with its own identifier (ID) and hence the received data are not destined for the data reception device of its own, then the controller 16 keeps the receiver 10 in a standby condition, waiting for data related to an address again in the step S411.

If the received data are destined for the data reception device of its own, then the controller 16 decides whether data following the data related to the address are received by the receiver 10 or not in a step S408. If not received, then the controller 16 keeps the receiver 10 in a standby condition, waiting for data to follow to the address data in the step S411.

If the data following the data related to the address are received by the receiver 10, then the decoder 11 decides whether the received data are related to a message or not based on the flag contained in the received data in a step S409. If the received data are not related to a message, then, because the received data are not data that should be received, the controller 16 keeps the receiver 10 in a standby condition, waiting for data related to a message in the step S411. If the received data are related to a message, then no error inspection and no error correction are carried out on the received data as indicated by the selected position of the selector switch 12, and the controller 16 directly stores the message data contained in the received data into the RAM 13 in a step S410. The step S410 is repeatedly executed on the following data related to a message.

Therefore, the message data contained in the received data are directly stored in the RAM 13 regardless of whether they suffer an error or not, and the display screen of the information processing apparatus 2 displays the message represented by the message data as it is.

Figure 5:
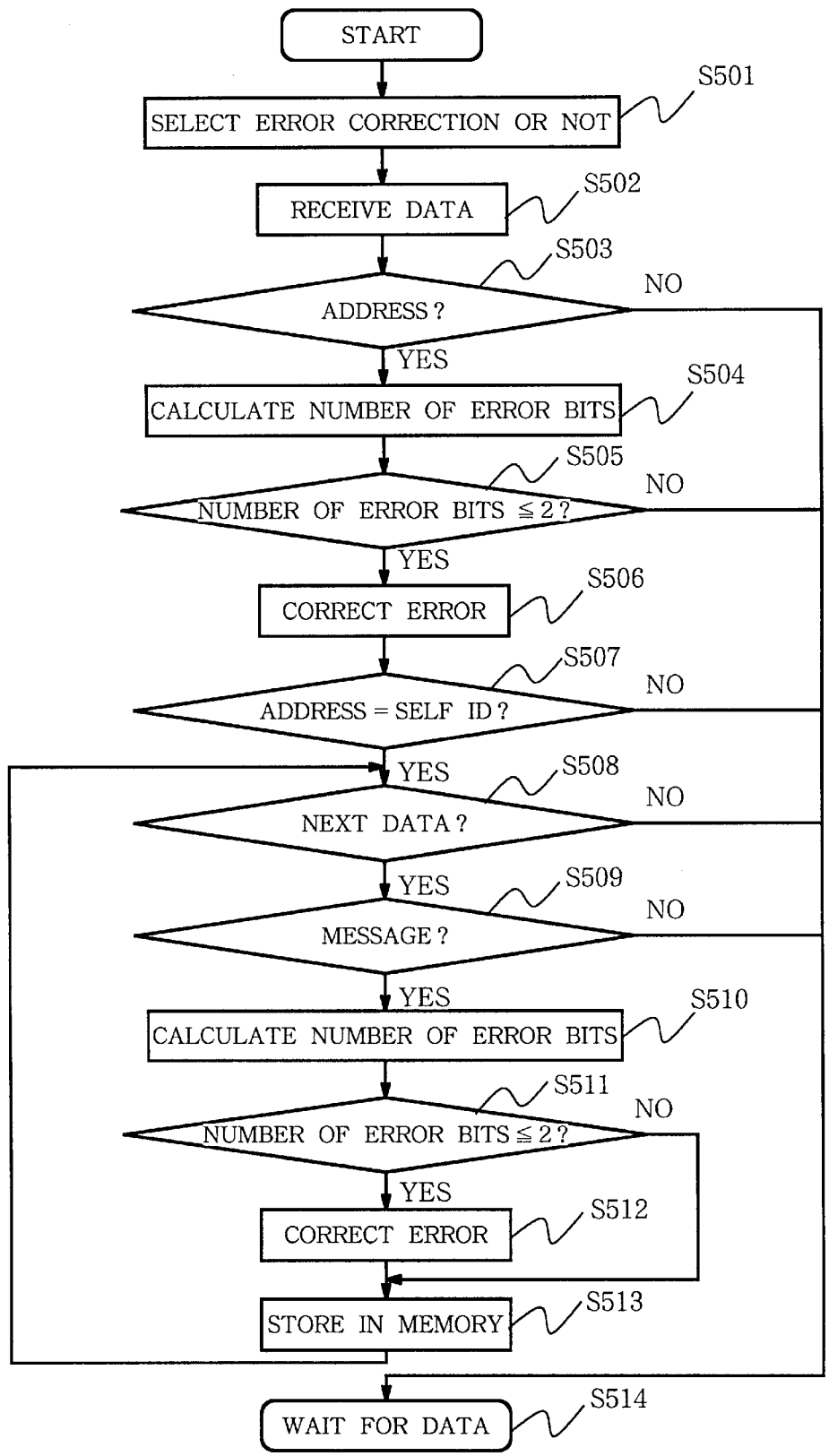
FIG. 5 is a flowchart of a data reception process effected by the data reception device when an error correction is to be carried out on message data.

FIG. 5 shows a data reception process effected by the data reception device when an error correction is to be carried out on the message data as instructed by the selector switch 12.

As shown in FIG. 5, after the selector switch 12 has been shifted to a position indicating that an error correction is to be carried out on the message data in a step S501, steps S502 through S509 are executed which are the same as the steps S402 through S409 described above with reference to FIG. 4 and hence will not be described in detail below.

If the received data following to an address data is related to a message in the step S509, then the decoder 11 inspects the received data based on the check data (BCH code) contained in the received data to determine whether an error has occurred or not and to calculate the number of error bits, if any, in a step S510.

If no error has occurred or the number of error bits is more than 2, then no error correction are carried out on the received data, and the controller 16 directly stores the message data contained in the received data into the RAM 13 in a step S513. If the number of error bits is 2 or less, then the decoder 11 effects an error correction on the received data thereby to recover the data in a step S512, and the controller 16 stores the message data contained in the received data into the RAM 13 in the step S513.

The storage of the message data is repeatedly executed on the following data related to a message. The message data contained in the received data are corrected for those whose number of error bits is 2 or less and remain uncorrected for those whose number of error bits is more than 2, and the message represented by those message data is displayed on the display screen of the information processing apparatus 2.

Figure 6:
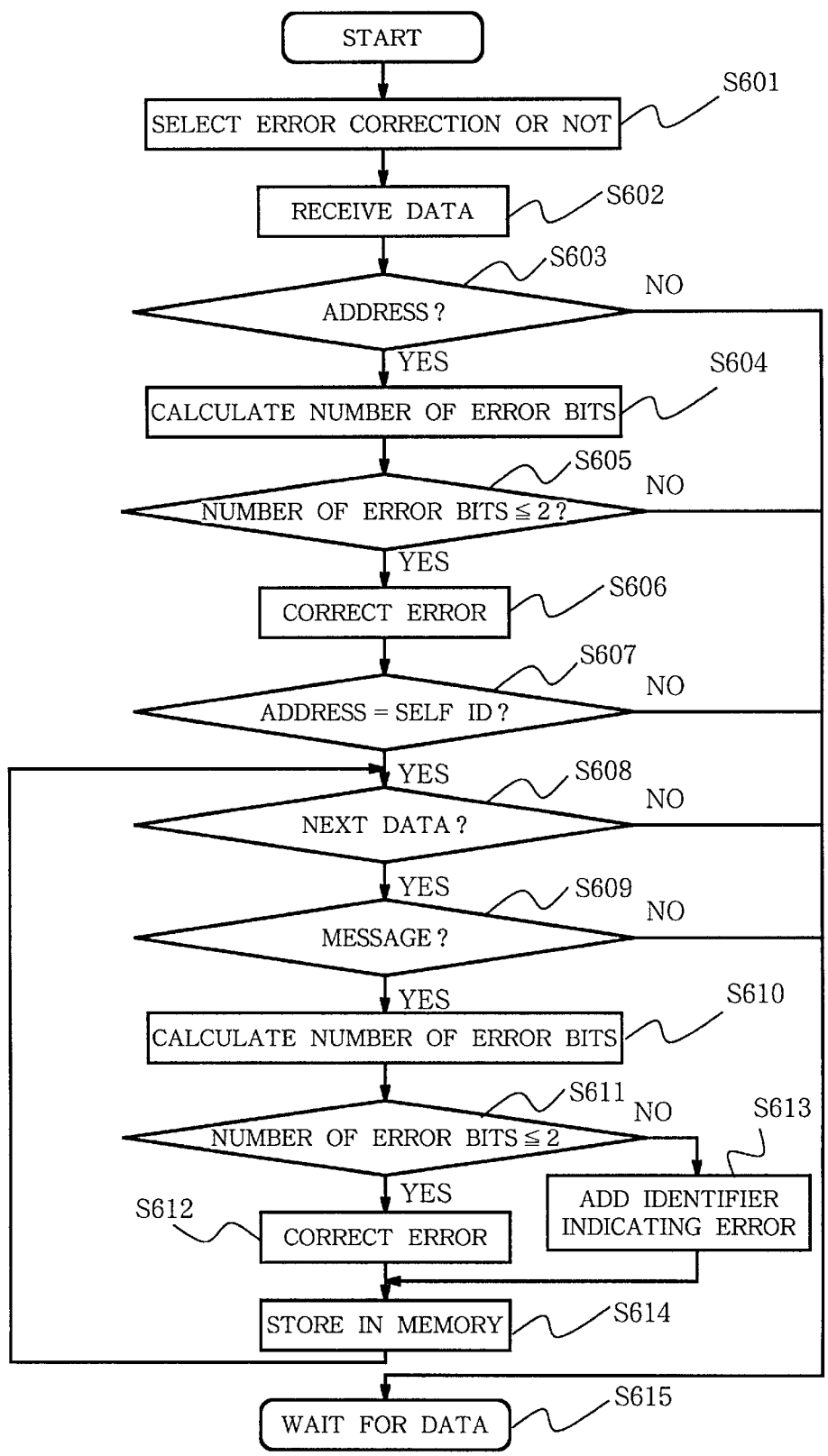
FIG. 6 is a flowchart of a data reception process effected by a data reception device according to a second embodiment of the present invention.

FIG. 6 shows a data reception process effected by a data reception device according to a second embodiment of the present invention. The data reception device according to the second embodiment is of the same structure as that of the data reception device according to the first embodiment, and receives data having the data structure shown in FIG. 2. The controller 16 of the data reception device according to the second embodiment serves to control the receiver 10, the decoder 11, the selector switch 12, the RAM 13, the ROM 14, and the interface 15, and also to add identification data to message data on which no error correction has been executed by the correcting means of the decoder 11, and to store the message data with the added identification data into the RAM 13.

The identification data indicate that the received data suffers an error, and serve to underscore or blink the message represented by the message data when the message is displayed on the display screen of the information processing apparatus 2. The identification data adds an identifier for allowing the message data that contains an error to be visually recognized on the display screen.

As shown in FIG. 6, after the selector switch 12 has been shifted to a position indicating that an error correction is to be carried out on the message data in a step S601, steps S602 through S609 are executed which are the same as the steps S402 through S409 described above with reference to FIG. 4 and hence will not be described in detail below.

If the received data following to an address data are related to a message in the step S609, then the decoder 11 inspects the received data based on the check data (BCH code) contained in the received data to determine whether an error has occurred or not and to calculate the number of error bits, if any, in a step S610.

If the number of error bits is 2 or less, then the decoder 11 effects an error correction on the received data thereby to recover the data in a step S612, and the controller 16 stores the message data contained in the received data into the RAM 13 in a step S614. If the number of error bits is more than 2, then no error correction is carried out on the received data, and the controller 16 adds identification data indicative of the occurrence of an error to the message data contained in the received data in a step S613, and stores the message data into the RAM 13 in the step S614. If no error has occurred, then the message data are directly stored into the RAM 13.

The storage of the message data is repeatedly executed on the following data related to a message. The message data contained in the received data are corrected for those whose number of error bits is 2 or less and remain uncorrected with the identifier added for those whose number of error bits is more than 2, and the message represented by those message data is displayed on the display screen of the information processing apparatus 2.

A process of detecting an error and a process of identifying an error bit using the BCH code will be described below.

These processes are carried out using a syndrome table shown in FIG. 7. The syndrome table contains 10-bit data given to each of bit positions 0~31. For example, 10-bit data "0000000001" are imparted to the bit position 0, and 10-bit data "1110110100" are imparted to the bit position 31.

Figure 8:
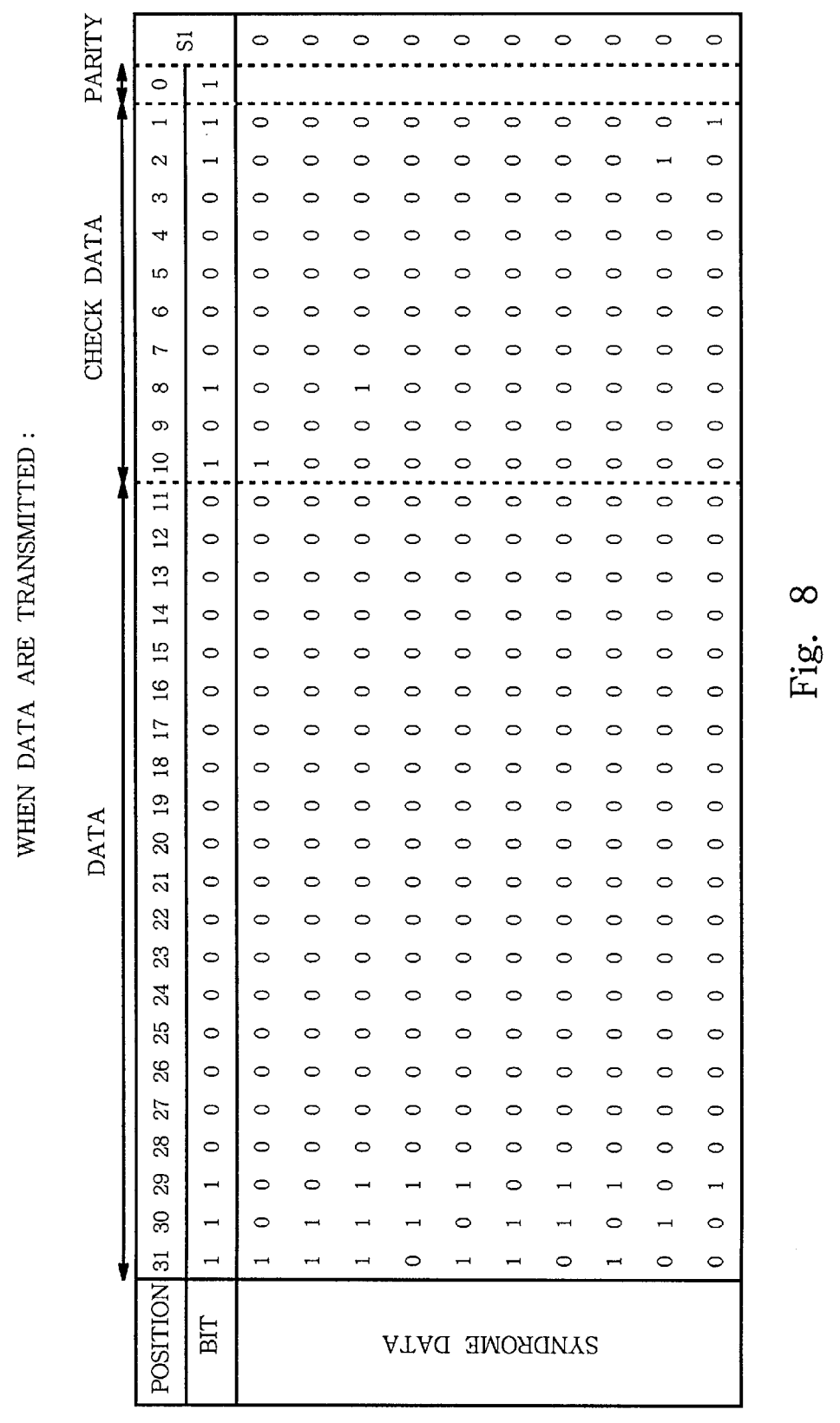

As shown in FIG. 8, if the flag (the bit position 31), the message data (the bit positions 30~13), the function bit (the bit positions 12, 11), the check data (the bit positions 10~1), and the even parity (the bit position 0) upon transmission, i.e., when there is no error bit, are "1", "110000000000000000", "00", and "1010000011", and "1", respectively, then a column associated with each bit position where the bit "1" is represented is given the data at the corresponding bit position in the syndrome table, and a column associated with each bit position where the bit "0" is represented is given data "0000000000". For example, since the bit "1" is represented in the bit position 31, the column associated with the bit position 31 is given the data "1110110100" at the bit position 31 in the syndrome table.

The bits of each row in the syndrome data shown in FIG. 8 are exclusive-ORed in the directions indicated by the arrows in FIG. 8, producing results in a right-hand column S1. For example, the bits "100 . . . 00" in the uppermost row in the syndrome data shown in FIG. 8 are exclusive-ORed, producing a result "0" in the right-hand column S1, and the bits "001 . . . 01" in the lowermost row in the syndrome data shown in FIG. 8 are exclusive-ORed, producing a result "0" in the right-hand column S1.

All the results thus calculated in the right-hand column S1 comprise bits "0000000000", indicating that the message data are correct.

Figure 9:
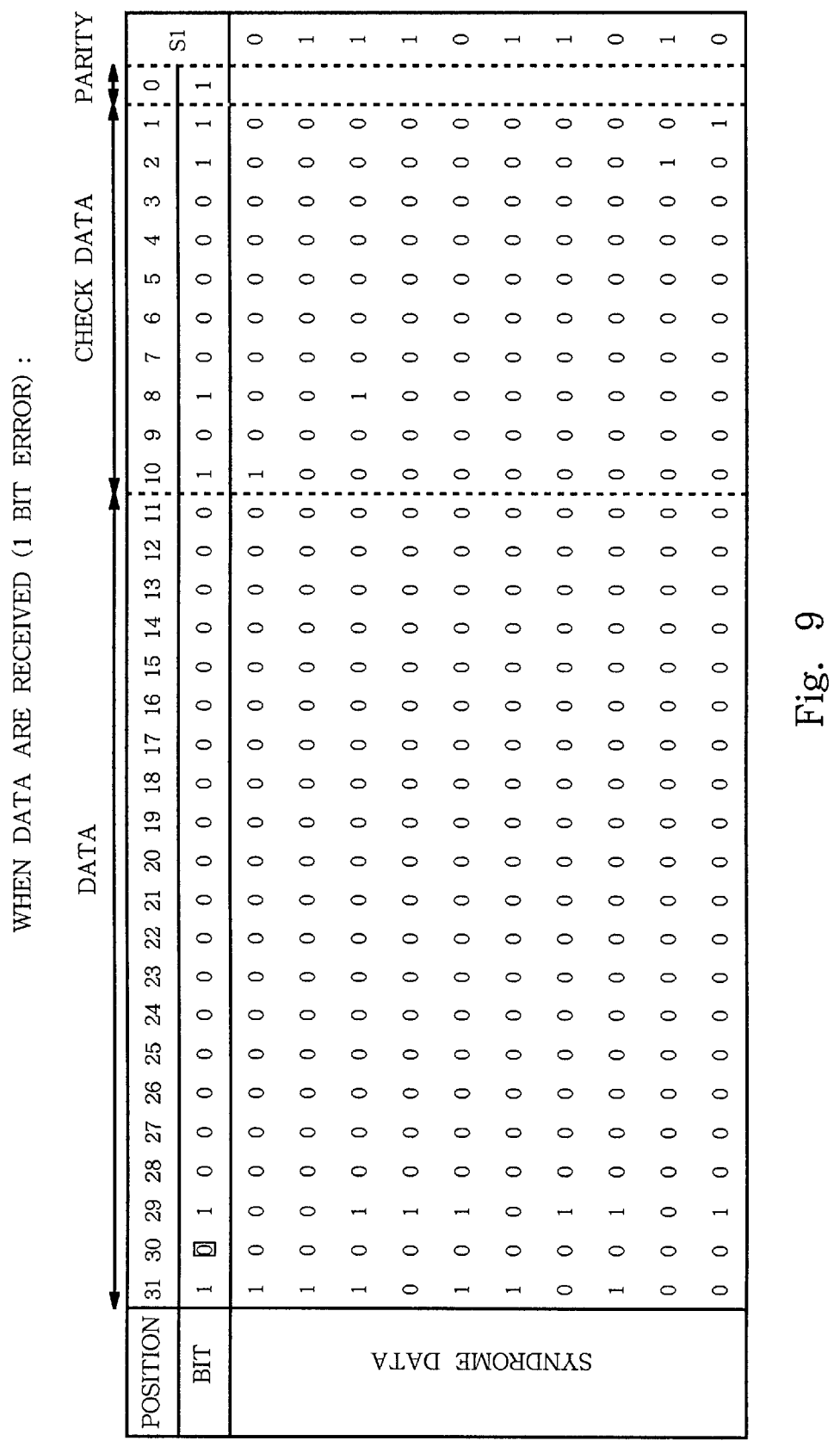

If the received data suffer one error bit at the bit position 30, then the columns associated with all the bit positions are given syndrome data, some from the syndrome table, as shown in FIG. 9. When the bits in the rows in the syndrome data are exclusive-ORed, all the results in the right-hand column S1 comprise bits "011011010". Since these bits "0111011010" in the right-hand column S1 agree with the data at the bit position 30 in the syndrome table, it is decided that an error has occurred at the bit position 30 in the received data. The error can be corrected by inverting the bit in the bit position 30.

If the received data suffer two error bits at the bit positions 30, 29, then the columns associated with all the bit positions are given syndrome data, some from the syndrome table, as shown in FIG. 10. When the bits in the rows in the syndrome data are exclusive-ORed, all the results in the right-hand column S1 comprise bits "0100110111". These bits "0100110111" in the right-hand column S1 do not agree with the data at any of the bit positions in the syndrome table.

The syndrome data at each of the bit positions in the syndrome table and the bits in the right-hand column S1 are then exclusive-ORed bit by bit. As a consequence, when the syndrome data at the bit position 30 in the syndrome table and the bits in the right-hand column S1 are exclusive-ORed, the results of the exclusive-ORing agree with the syndrome data at the bit position 29 in the syndrome table. More specifically, when the syndrome data "0111011010" at the bit position 30 in the syndrome table and the bits "0100110111" in the right-hand column S1 are exclusive-ORed bit by bit, the results are "0011101101" which agree with the syndrome data at the bit position 29 in the syndrome table. No such results in agreement with the syndrome data at the bit position 29 in the syndrome table are obtained when the syndrome data at the other bit positions in the syndrome table and the bits in the right-hand column S1 are exclusive-ORed.

Therefore, it is decided that errors have occurred in the bit positions 30, 29 in the received data. These errors can be corrected by inverting the bits in the bit positions 30, 29 in the received data.

If the received data suffer three error bits, then the syndrome data at each of the bit positions in the syndrome table and the bits in the right-hand column S1 are then exclusive-ORed bit by bit. The results of the exclusive- ORing are then compared with the syndrome table. However, the results of the exclusive-ORing do not agree with the data at any of the bit positions in the syndrome table. Therefore, it cannot be decided which bit position the errors have occurred in, and the errors cannot be corrected.

Likewise, four or more error bits cannot be located and corrected.

The process of detecting an error and the process of identifying an error bit using a cyclic code such as the BCH code are well known in the art, and can easily be carried out as described above. Three or more error bits may possibly be corrected in the present invention depending on the type of a cyclic code used and the process of detecting an error and the process of identifying an error bit.

While the above embodiments have been described with respect to the card-type data reception device, the principles of the present invention are also applicable to a relatively large stationary data reception device. In the illustrated embodiments, the data reception device is inserted into the information processing apparatus to display message data on the display screen of the information processing apparatus. However, the data reception device itself may have a display unit of its own for displaying message data on the display screen of the display unit.

With the above arrangement of the data reception device according to the present invention, because whether an error correction is to be carried out or not is selected according to an instruction from the user through the selector switch, the user is prevented from failing to ascertain the meaning of space letters substituted as a result of an error correction, and message data suffering an error are displayed as they are to convey the message to the user to a certain extent. Inasmuch as information is usually received based on 10 or more message data, therefore, the overall information can be guessed even if some of the message data suffer an error.

Furthermore, because whether an error correction is to be carried out or not is determined depending on the number of error bits that can be corrected, an error correction which may lead the user to fail to understand the meaning of corrected data is avoided, and message data suffering an error are displayed as they are to convey the message to the user to a certain extent.

Moreover, an identifier indicating that no error correction has been made is added to a message on which no error correction has been made. Consequently, the user can readily recognize which portion of information comprising several messages contains an error. As a result, information can be transmitted accurately.

Although certain preferred embodiments of the present invention have been shown and described in detail, it should be understood that various changes and modifications may be made therein without departing from the scope of the appended claims.

What is claimed is:

1. A data reception device for receiving data including message data and check data for checking an error, comprising:

receiver means for receiving data which are transmitted;

decision means for detecting a number of error bits contained in the received data based on the check data contained in the received data;

correction indicating means for indicating an error correction to be carried out on the error bits if the detected number of error bits is a predetermined number or less;

correcting means for effecting an error correction on the message data contained in the received data which suffer the error as detected by said decision means, based on the indication given by said correction indicating means; and memory means for storing the message data contained in the received data;

wherein the data received by said receiver means contains a flag indicating whether the received data is address data or message data, and check data for inspecting the error, said data reception device further comprising:

type determining means for determining a type of the received data based on said flag; and control means for adding identifier data indicative of the occurrence of the error to message data on which no error correction is to be made by said correcting means, and storing the message data with the added identifier data in said memory means.

2. A data reception device for receiving data including message data and check data for checking an error, comprising:

receiver means for receiving data which are transmitted;

decision means for detecting a number of error bits contained in the received data based on the check data contained in the received data;

correction indicating means for indicating an error correction to be carried out on the error bits if the detected number of error bits is a predetermined number or less;

selector means, operable by user, for instructing the error correction to be carried out on the error;

correcting means for effecting the error correction on the message data contained in the received data which suffer the error as detected by said decision means, based on the indication given by said correction indicating means and the instruction given by said selector means; and memory means for storing the message data contained in the received data wherein the data received by said receiver means contains a flag indicating whether the received data is address data or message data, and check data for inspecting an error, said data reception device further comprising:

type determining means for determining a type of the received data based on said flag; and control means for adding identifier data indicative of the occurrence of the error to message data on which no error correction is to be made by said correcting means, and storing the message data with the added identifier data in said memory means.

3. A data reception device for receiving data including message data and check data for checking an error, comprising:

receiver means for receiving data which are transmitted;

decision means for detecting the number of error bits contained in the received data based on the check data contained in the received data;

correction indicating means for indicating an error correction to be carried out on the error bits if the detected number of error bits is a predetermined number or less;

correcting means for effecting the error correction on the message data contained in the received data which suffer the error as detected by said decision means, based on the indication given by said correction indicating means; and memory means for storing the message data contained in the received data;

wherein said check data comprises BCH data, said decision means referring to a syndrome table to identify an error bit, said correction indicating means indicating the error correction to be carried out on the error if the detected number of error bits is 2 or less, and said correcting means correcting the error bits which are identified by said decision means;

wherein the data received by said receiver means contains a flag indicating whether the received data is address data or message data, and check data for inspecting an error, said data reception device further comprising:

type determining means for determining a type of the received data based on said flag; and control means for adding identifier data indicative of the occurrence of the error to message data on which no error correction is to be made by said correcting means, and storing the message data with the added identifier data in said memory means.

4. A data reception device for receiving data including message data and check data for checking an error, comprising:

receiver means for receiving data which are transmitted;

decision means for detecting a number of error bits contained in the received data based on the check data contained in the received data;

correction indicating means for indicating an error correction to be carried out on the error bits if the detected number of error bits is a predetermined number or less;

selector means, operable by user, for instructing the error correction to be carried out on the error;

correcting means for effecting the error correction on the message data contained in the received data which suffer the error as detected by said decision means, based on the indication given by said correction indicating means and the instruction given by said selector means; and memory means for storing the message data contained in the received data wherein said check data comprises BCH data, said decision means referring to a syndrome table to identify an error bit, said correction indicating means indicating an error correction to be carried out on an error if the detected number of error bits is 2 or less, and said correcting means correcting an error bit which is identified by said decision means;

wherein the data received by said receiver means contains a flag indicating whether the received data is address data or message data, and check data for inspecting an error, said data reception device further comprising:

type determining means for determining a type of the received data based on said flag; and control means for adding identifier data indicative of the occurrence of the error to message data on which no error correction is to be made by said correcting means, and storing the message data with the added identifier data in said memory means.

5. A data reception device according to claim 4, for use as a card-type data reception device, further comprising:

interface means for connecting the card-type data reception device to an information processing apparatus having a display unit, and for transmitting the message data stored in said memory means to said information processing apparatus for display on said display unit.

6. A data reception device according to claim 1, for use as a card-type data reception device, further comprising:

interface means for connecting the card-type data reception device to an information processing apparatus having a display unit, and for transmitting the message data stored in said memory means to said information processing apparatus for display on said display unit.

7. A data reception device according to claim 2, for use as a card-type reception device, further comprising:

interface means for connecting the card-type data reception device to an information processing apparatus having a display unit, and for transmitting the message data stored in said memory means to said information processing apparatus for display on said display unit.

8. A data reception device according to claim 3, for use as a card-type data reception device, further comprising:

interface means for connecting the card-type data reception device to an information processing apparatus having a display unit, and for transmitting the message data stored in said memory means to said information processing apparatus for display on said display unit.

9. A data reception device according to claim 4, for use as a card-type reception device, further comprising:

interface means for connecting the card-type data reception device to an information processing apparatus having a display unit, and for transmitting the message data stored in said memory means to said information processing apparatus for display on said display unit.

10. A data reception device for receiving data including message data and check data for checking an error, comprising:

a receiver means for receiving data which are transmitted;

decision means for detecting whether the received data suffers an error or not based on the check data contained in the received data;

selector means for instructing an error correction to be carried out on the error;

correcting means for effecting the error correction on the message data contained in the received data which suffers the error as detected by said decision means, based on an instruction given by said selector means; and memory means for storing the message data contained in the received data;

wherein the data received by said receiver means contains a flag indicating whether the received data is address data or message data, and check data for inspecting the error, said data reception device further comprising:

type determining means for determining a type of the received data based on said flag; and control means for adding identifier data indicative of the occurrence of the error to message data on which no error correction is to be made by said correcting means, and storing the message data with the added identifier data in said memory means.

* * * * *